July 7, 1964  R. G. FRIEDMAN  3,139,776
THREAD ROLLER

Filed Sept. 26, 1960  9 Sheets-Sheet 1

INVENTOR.
ROBERT G. FRIEDMAN
BY
RICHEY, McNENNY, & FARRINGTON
Donald W. Farrington
ATTORNEYS

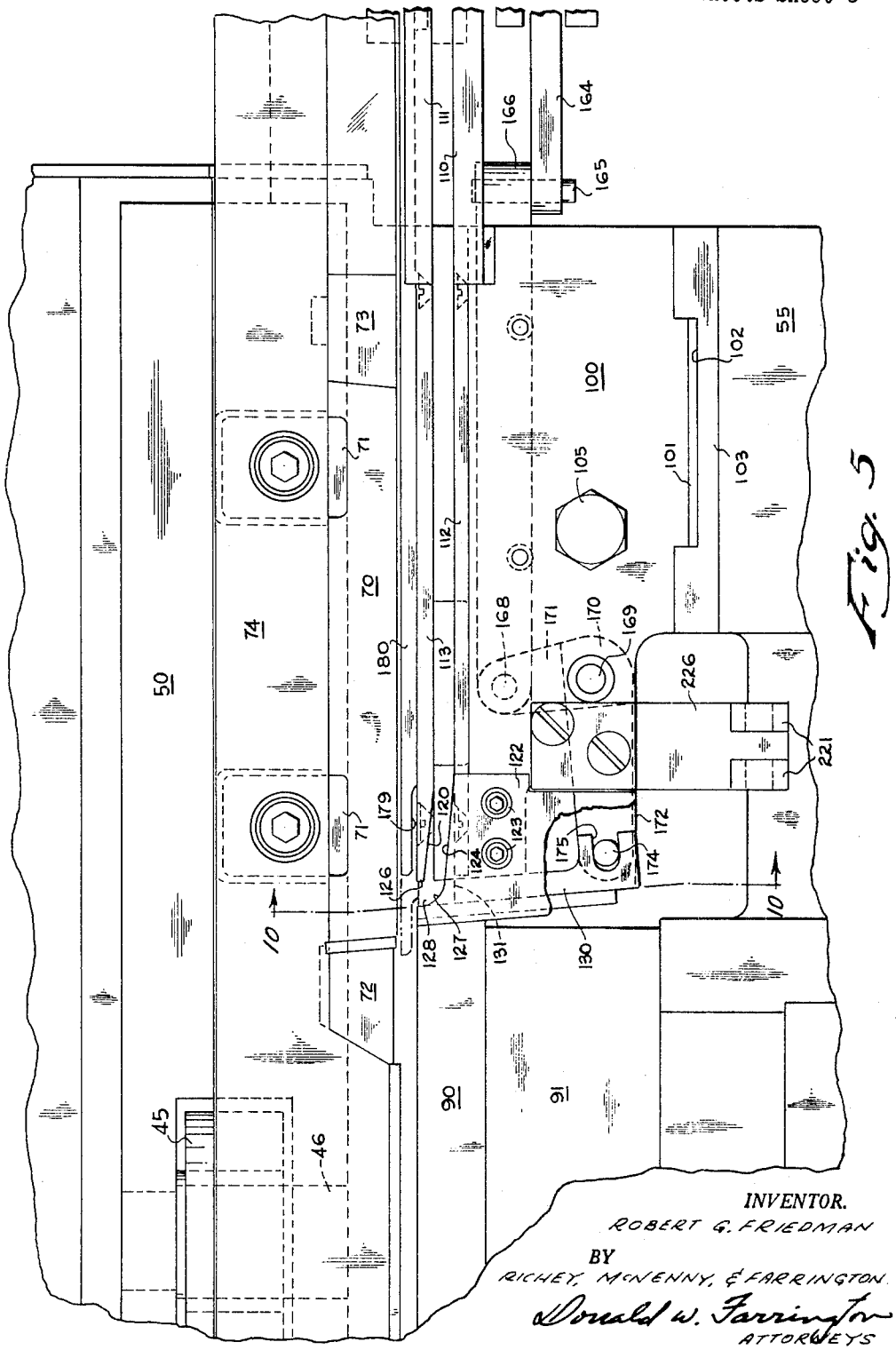

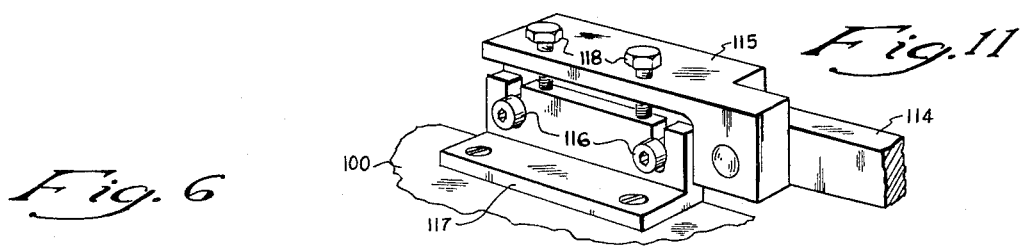
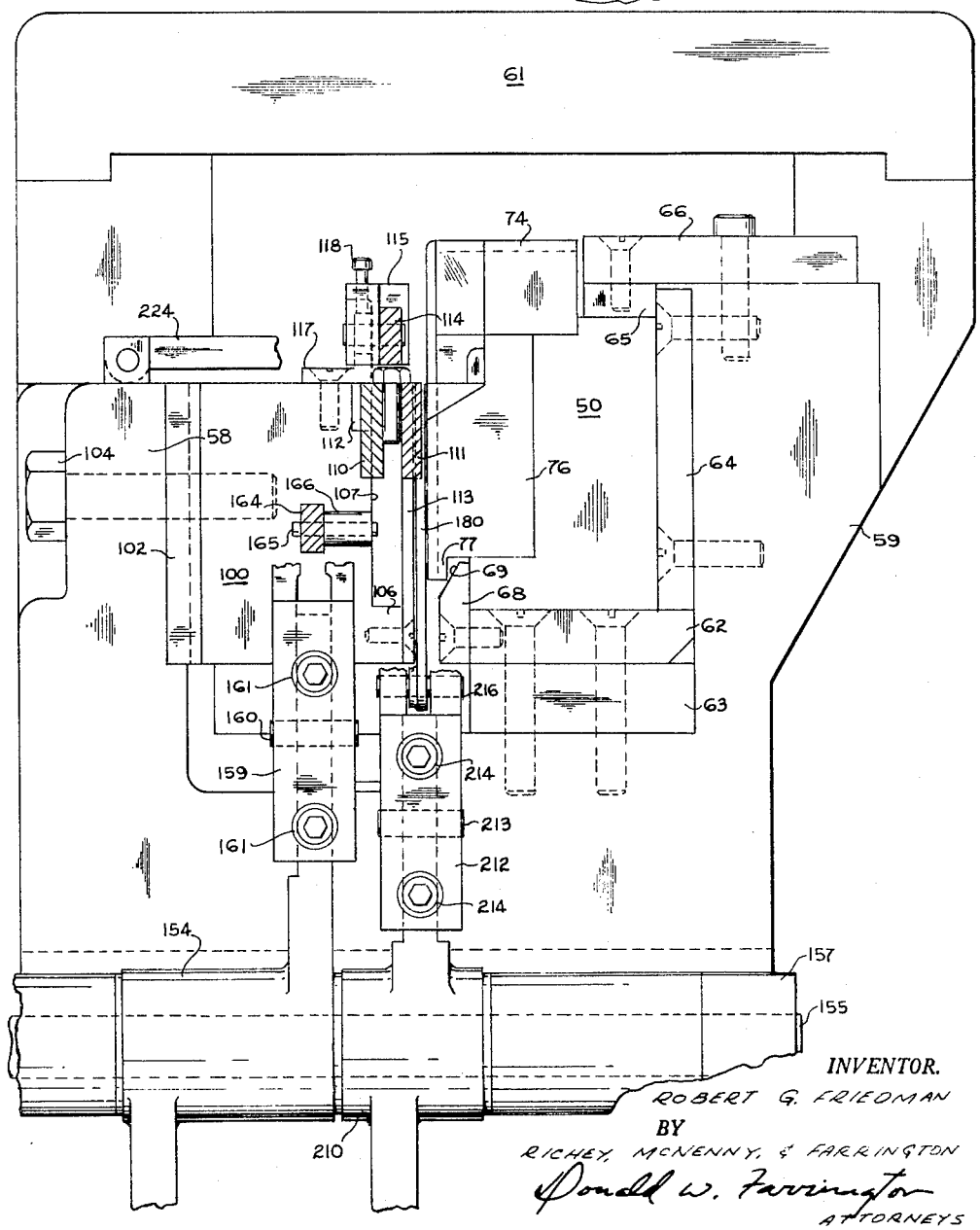

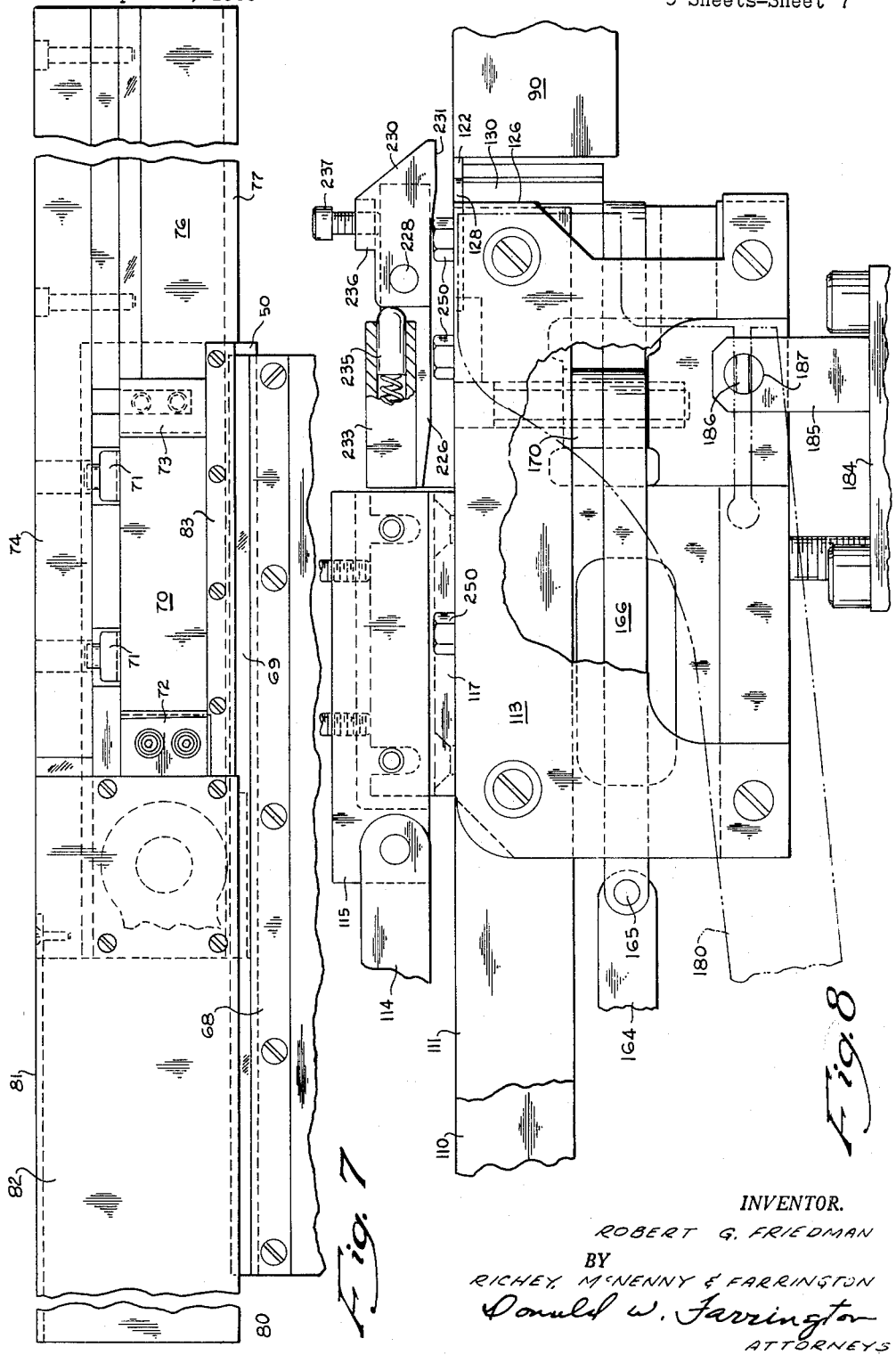

July 7, 1964 R. G. FRIEDMAN 3,139,776
THREAD ROLLER
Filed Sept. 26, 1960 9 Sheets-Sheet 8

INVENTOR.
ROBERT G. FRIEDMAN
BY
RICHEY, McNENNY, & FARRINGTON
Donald W. Farrington
ATTORNEYS

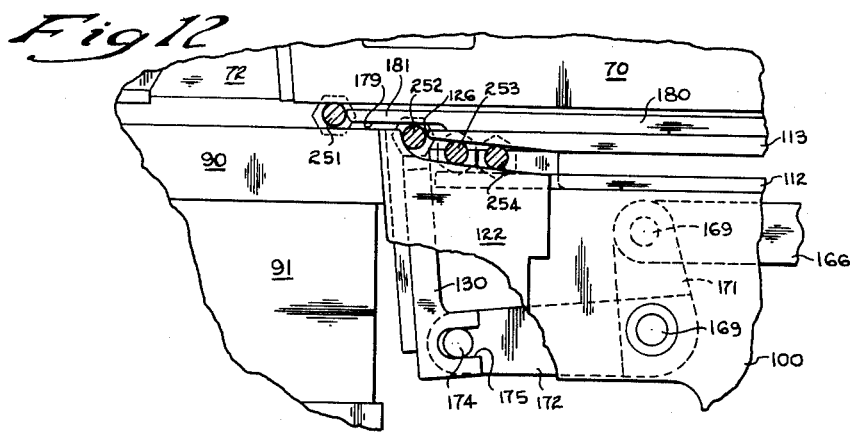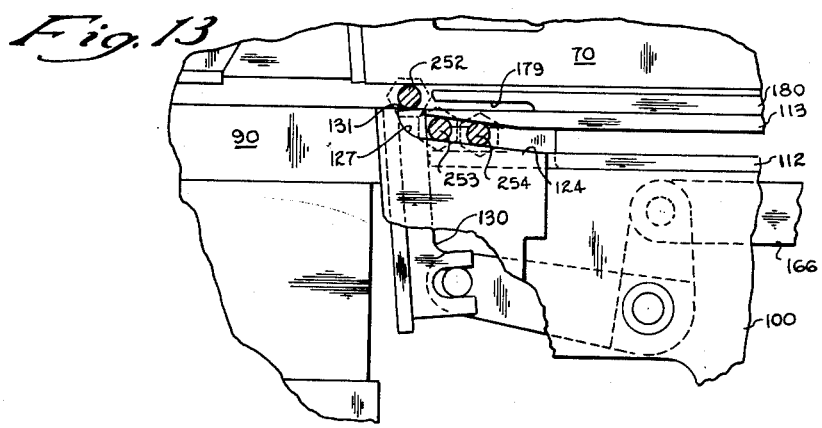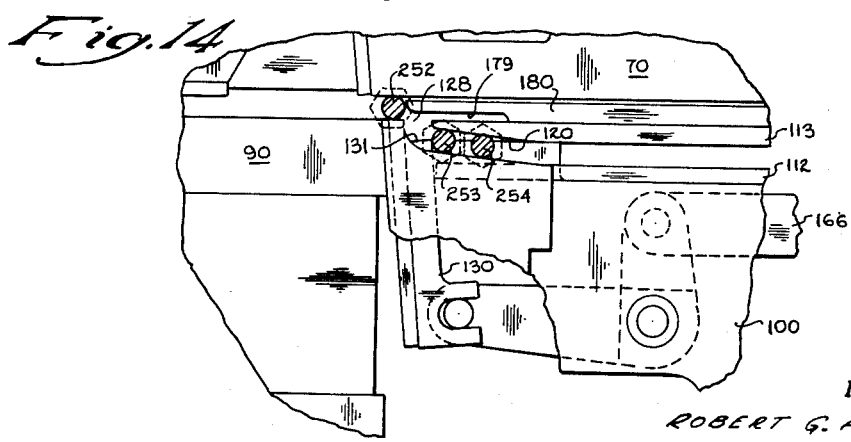

United States Patent Office 3,139,776
Patented July 7, 1964

3,139,776
THREAD ROLLER
Robert G. Friedman, Tiffin, Ohio, assignor to The National Machinery Company, Tiffin, Ohio, a corporation of Ohio
Filed Sept. 26, 1960, Ser. No. 58,299
5 Claims. (Cl. 80—8)

This invention relates to thread rolling machines of the type adapted to form screw threads on work pieces which are rolled between a pair of relatively moving flat dies.

It is an object of this invention to provide an improved blank feeding mechanism for a thread rolling machine which is capable of operation at higher speeds without sacrifice of the accuracy and quality of the threaded parts. The blank feeding mechanism serves not only to feed a blank into the die space between the dies for each cycle of the thread rolling dies, but also to maintain proper alignment of the blank as it is presented to the thread rolling dies to insure that the threads are properly formed on the blank. When the speed of thread rolling machines and the associated blank feeding mechanism is increased, there is a greater tendency for the blank feeding mechanism to lose control over the blanks being fed thereby causing possible jamming of the blanks during feeding and the presentation of improperly aligned blanks to the thread rolling dies.

An important feature of this invention is a novel arrangement for the feed tracks carrying the blanks to the blank feeding mechanism. The thread rolling dies are inclined at an angle to the horizontal, with the feed tracks extending downward parallel to the axis of the dies and inclined to the horizontal at the same angle. Thus the blanks are fed to the blank feeding mechanism under the force of gravity and the weight of the other blanks within the feed tracks. By employing a drive mechanism which pulls the moving die slide from the front or output end, the drive mechanism can be placed below and in front of the machine, thereby allowing the feed tracks to be spaced immediately next to and parallel with the die space. The lower end of the feed tracks is angled toward the die space, so that the pusher which feeds blanks within the die space into the bite of the dies also acts as a gate to close off the transfer opening at the lower end of the tracks. To insure the positive feeding of the lowermost blank into the space in front of the pusher when the latter is retracted to open the lower end of the tracks, a reciprocating injector is actuated to move transversely toward the die space. This injector closes off the track below the stack of blanks and moves through a distance corresponding substantially to the diameter of a blank to transfer the lowermost blank in the feed tracks into the die space in front of the pusher.

During the greater part of the machine cycle, the pusher dwells in the forward position, closing off the transfer space at the end of the feed tracks, and the lowermost blank rests against the side of the pusher. Since the pusher dwells in the forward position, the injector operates to transfer a blank into the die space only during the portion of the cycle when the pusher is retracted. The injector is therefore in the retacted position during the major portion of the cycle, and more time is allowed for the blanks to feed downward under gravity to fill the lower end of the feed tracks and insure that the lowermost blank is in position against the pusher. Thus the possible failure of the blank feeding mechanism to feed a blank into the die space and thereby cause the subsequent stroke of the dies to be a lost stroke is greatly decreased.

Another feature of the invention is the provision of drive for the reciprocating thread rolling die which employs a crank pin and connecting rod in which the ratio between the crank pin offset and the length of the connecting rod is relatively small. As a result, the motion of the thread rolling die is considerably distorted from a true sinusoidal motion by allowing a slower rate of movement for the moving die slide during the reversal at the retracted position while speeding up the reversal at the end of the threading stroke. As a result of this construction, the die slide remains at the rearward end of its stroke for a larger portion of the cycle and allows the die space to be open for the feeding of a blank for a larger portion of the cycle than would otherwise be possible if the die slide had a more nearly sinusoidal movement. Thus the actual time for feeding the blank into the die space is increased at the same time the cyclic speed of the machine is increased.

Further objects and advantages of the invention which provide improved performance in the threading operations at higher speeds, together with more simple and rugged construction will readily become apparent to those skilled in the art upon a more complete understanding of the invention, one embodiment of which is shown in the accompanying drawings and described in detail in the following description.

In the drawings:

FIG. 5 is an enlarged top plan view showing the details of the blank feeding mechanism;

FIG. 6 is an end elevational view of the die housing;

FIG. 7 is a side elevational view of the die slide;

FIG. 8 is a vertical elevational view of the injector housing;

FIG. 11 is a perspective detail view of the top guide mounting; and

FIGS. 12, 13 and 14 are enlarged partial plan views of the blank feeding mechanism showing the position of the parts at various stages of the blank feeding cycle.

Figure 1:
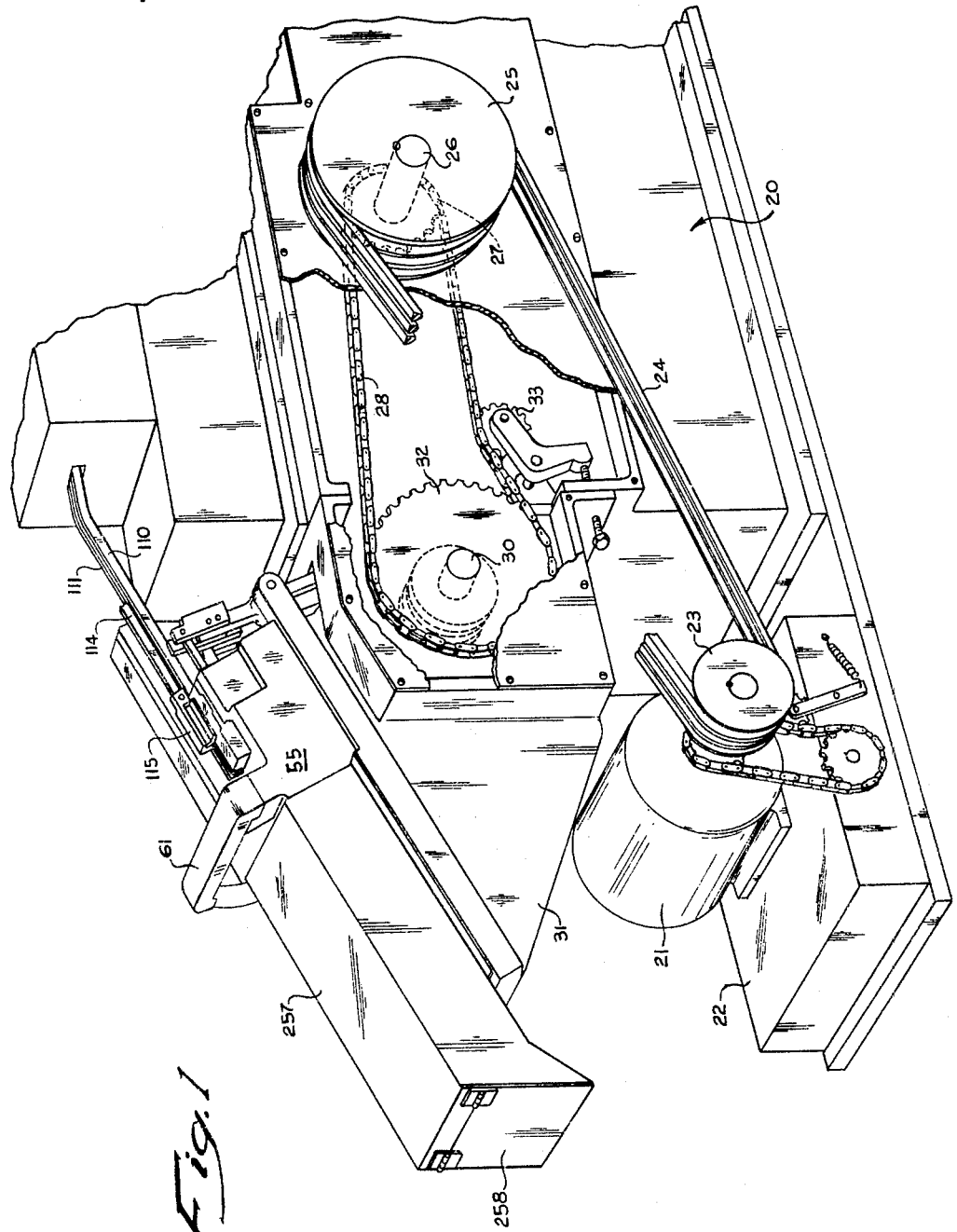
FIG. 1 is a perspective view with parts broken away of the thread rolling machine mounted on a heading machine.

As is shown in FIG. 1, the thread roller is mounted on the end of the heading or blank forming machine indicated generally at 20 and is driven by a take off drive from the heading machine. The heading machine is driven by an electric motor 21 mounted on base 22 and carrying a V-belt sheave 23. The V-belts indicated at 24 extend from sheave 23 to the larger sheave 25 on the main driveshaft 26 of the heading machine to drive the latter at a reduced speed. A chain sprocket 27 is mounted on driveshaft 26 and is connected by a drive chain 28 to a spracket 32 mounted on the end of the thread roller crankshaft 30. Crankshaft 30 is rotatably journaled in the thread roller drive housing 31 which is mounted on the rear end of the heading machine 20. A suitable idler sprocket mechanism indicated at 33 is employed to maintain the proper tension in the chain 28.

The heading machine indicated at 20 may be of the double flow header type as shown in the application of R. G. Friedman Serial No. 770,805, filed October 30, 1958, and in the patent to J. H. Friedman, No. 2,599,053 issued June 3, 1952. In machines of this type a blank is headed for every two rotations of the main driveshaft 26, and accordingly the driven sprocket 32 on crankshaft 30 has twice the diameter of drive sprocket 27 to effect a 2 to 1 speed reduction in the drive to the thread roller. Thus the crankshaft 30 will make one revolution for every two revolutions of the mainshaft 26, so that the thread roller operates at the same cyclic speed as does the heading machine. The heading machine will not be described in greater detail inasmuch as it forms no part of the present invention.

Figure 2:
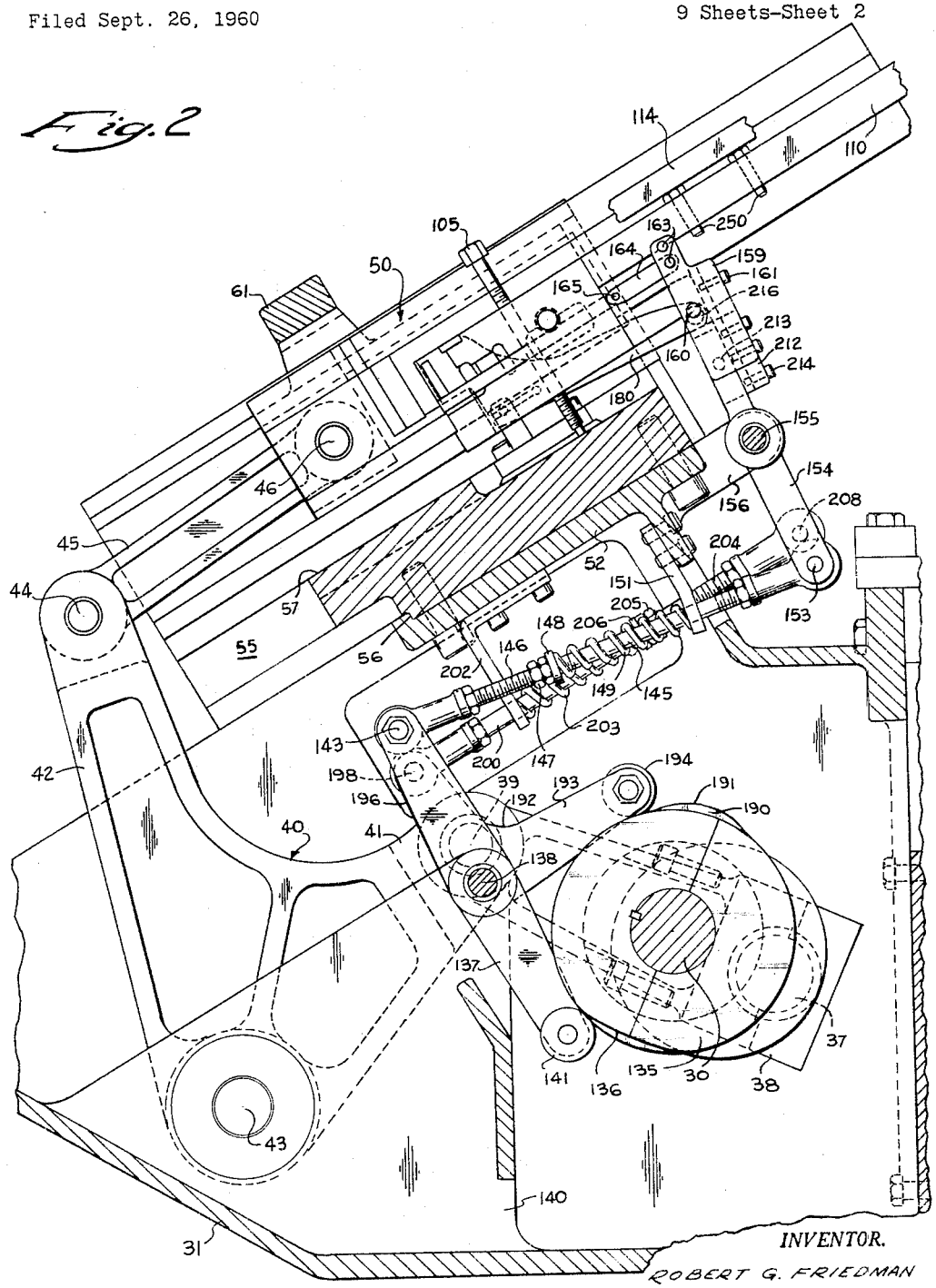
FIG. 2 is a vertical longitudinal cross-sectional view through the thread roller.
Figure 3:
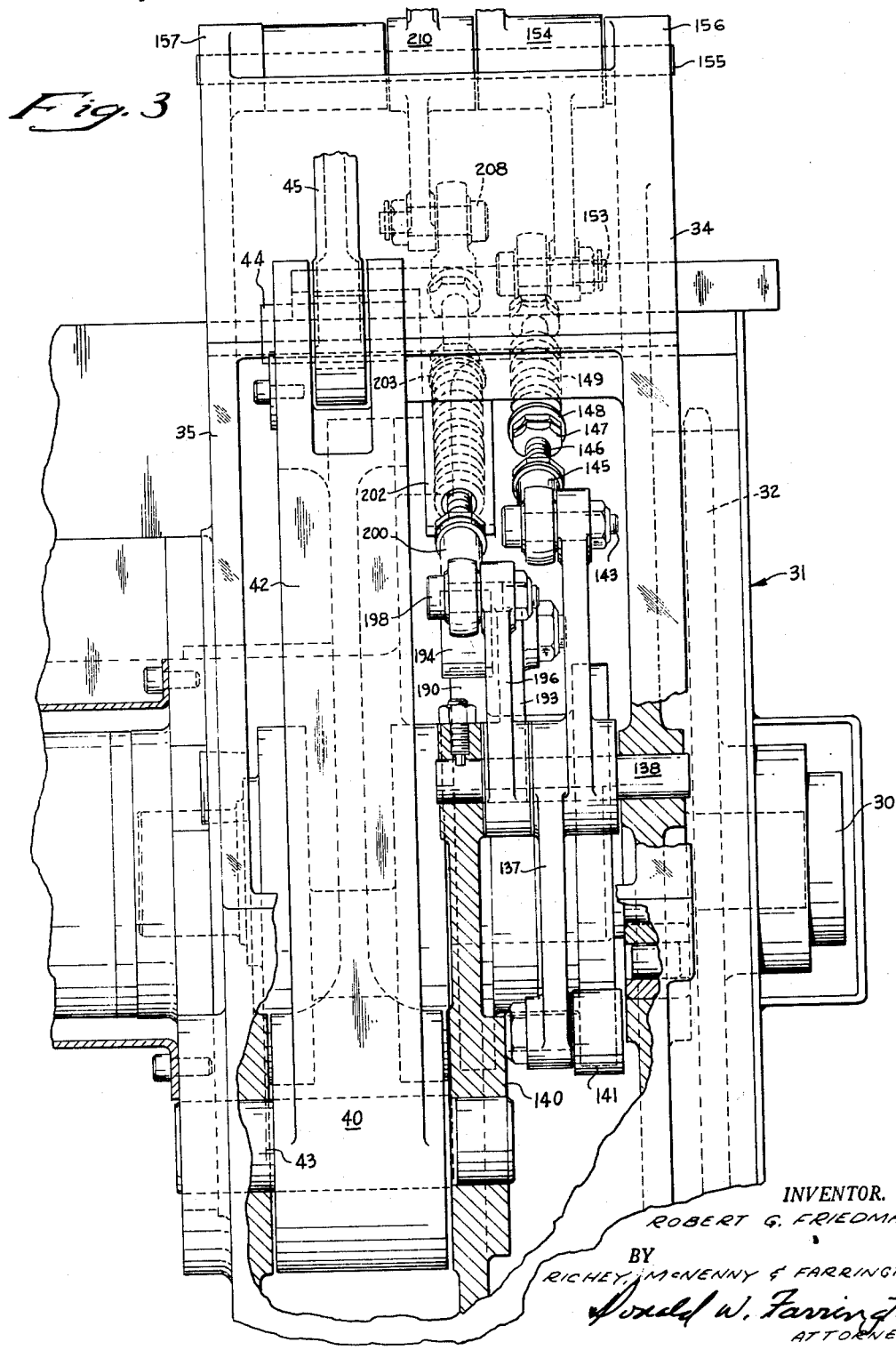
FIG. 3 is an end elevational view of the thread roller drive mechanism with parts broken away.

The driving mechanism of the thread roller is shown in greater detail in FIGS. 2 and 3. The crankshaft 30 extends transversely across drive housing 31 and is journaled in suitable bearings carried on the drive housing side walls 34 and 35. In the portion adjacent the side wall 35, crankshaft 30 is provided with an eccentric crank pin 37 on which is journaled a connecting rod or pitman 38. At its other end connecting rod 38 carries a pivot pin 39 by which it is attached to one arm 41 of a bell crank drive lever 40. Drive lever 40 is pivotally journaled at its lower end on a pivot pin 43 mounted in the drive housing 31. The other arm 42 of drive lever 40 extends upwardly and at its upper end is pivotably connected by a pivot pin 44 to one end of the connecting link 45. At its other end connecting link 45 is journaled on a pivot pin 46 carried on the die slide 50.

Above the crankshaft 30, drive housing 31 is provided with a sloping top wall 52 interconnecting the side walls 34 and 35 to provide a support for the die housing 55 which is mounted on top wall 52 and held in place by bolts 54. The die housing is inclined at an angle to the horizontal to allow the blank to be fed to the dies by the force of gravity. A step 56 is provided on the bottom wall 57 of die housing 55 to engage an abutting step on the top wall 52 to position the die housing 55 and provide a thrust support during the work stroke of the die slide 50.

The die housing 55 serves as a support for the stationary or fixed roll threading die and the moving roll threading die which is mounted on die slide 50, as well as for the blank feeding mechanism which feeds the blanks to the roll threading dies. Die housing 55 includes a bottom wall 57 from each side of which extend upward the side walls 58 and 59, as shown most clearly in FIG. 6. A tie bar 61 extends transversely across the die housing 55 to interconnect the upper ends of the side walls 58 and 59 to prevent the springing of these walls as the result of forces encountered during thread rolling. The die slide 50 is journaled to slide axially along the die housing adjacent the side wall 59, and is journaled on its bottom surface on a bearing plate 62 attached to a mounting plate 63 which in turn is secured on the bottom wall 57 of the die housing. A side bearing plate 64 is mounted between the outer side of die slide 50 and die housing side wall 59, and a top bearing plate 65 is secured to the lower side of the top cap 66 which in turn is fastened on the upper surface of side wall 59. On the inside, die slide 50 is positioned within the channel formed by the bearing plates 62, 64 and 65 by an inside bearing plate 68 which contacts the inner side of the die slide 50 along its lower edge and which is secured to the inner edge of the bottom bearing plate 62.

The moving die 70 is mounted in a recess on the upper inside edge of slide 50 rearwardly of the pivot pin 46. The die is held in place by means of suitable top clamps 71 and positioned axially along the slide by means of clamping blocks 72 and 73 at leading end trailing edges of the die, respectively.

Figure 4:
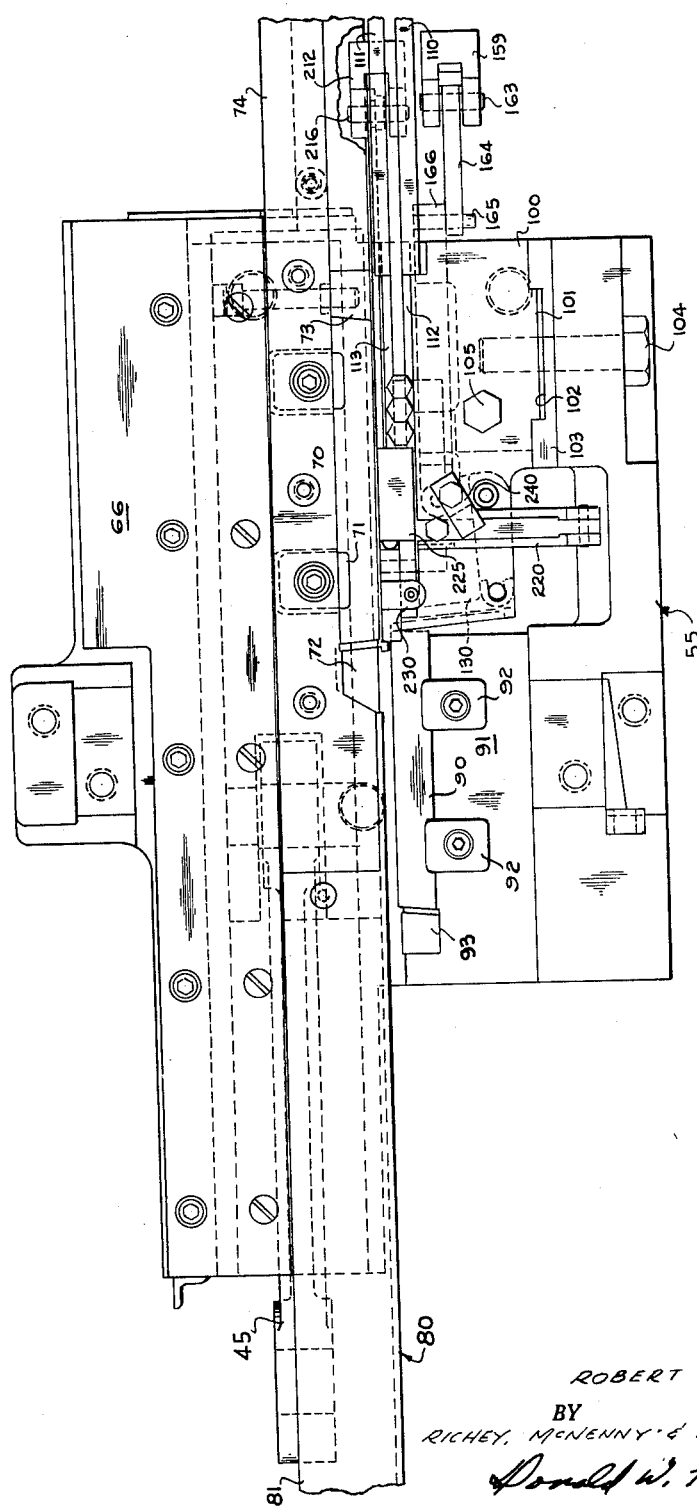
FIG. 4 is a top plan view with parts broken away.
Figure 9:
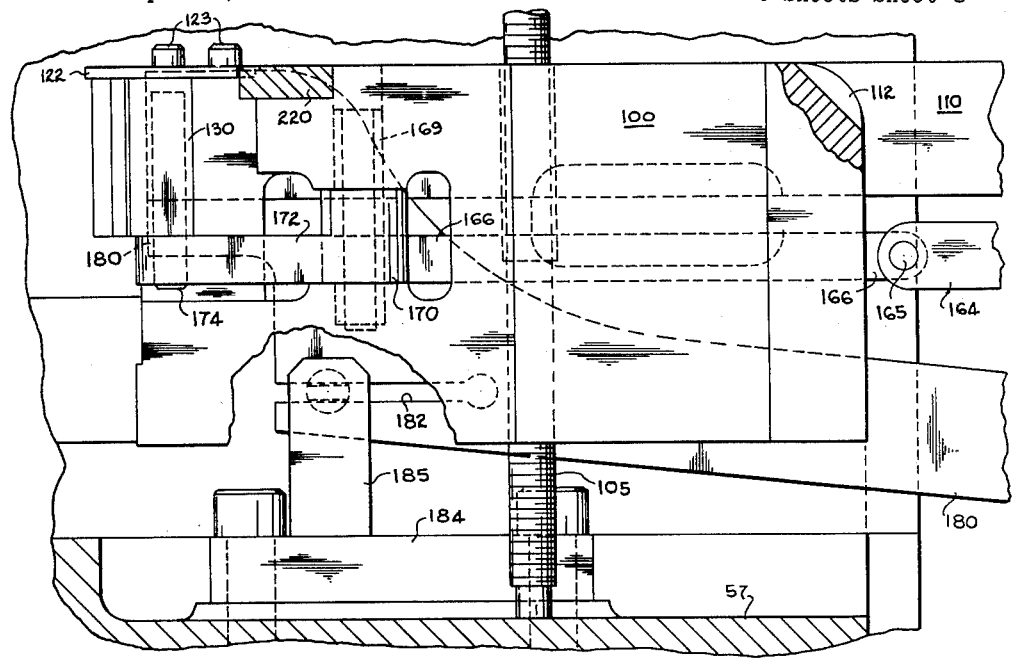
FIG. 9 is an elevational view of the injector housing looking from the direction opposite to that of FIG. 8.
Figure 10:
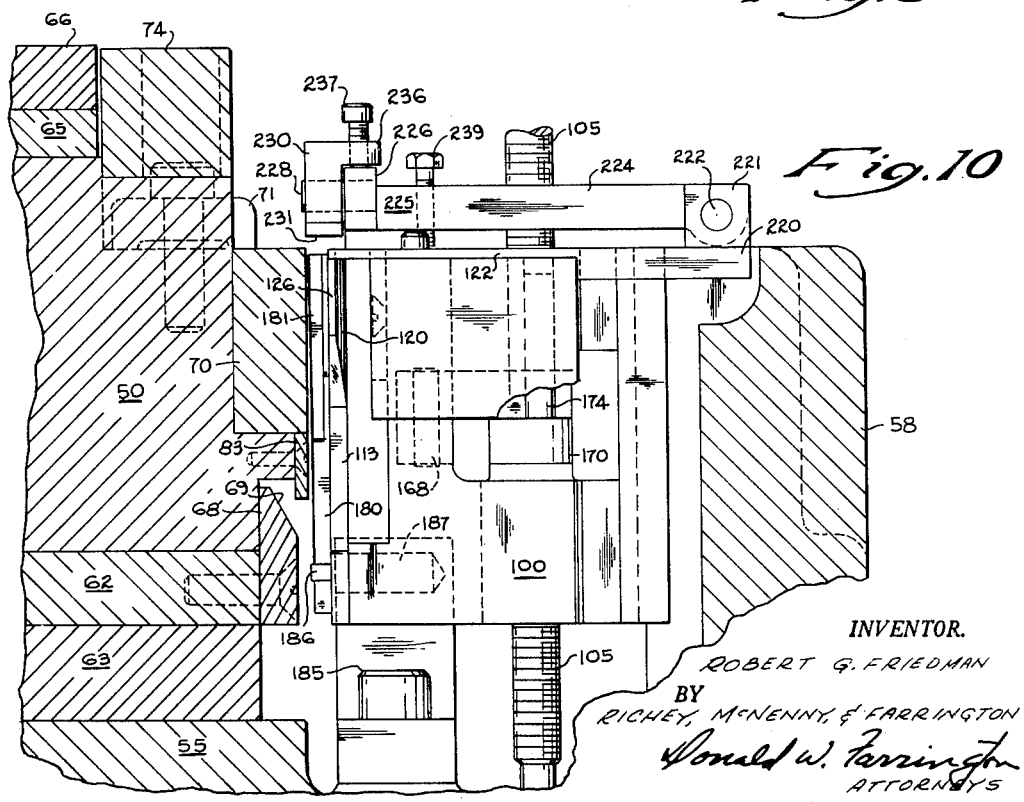
FIG. 10 is a cross-sectional view through the die housing taken along line 10—10 of FIG. 5.

To prevent the possible entry of dirt and chips into the bearing surfaces on which the die slide 50 is journaled, the slide is provided with attached shields and covers adapted to extend over and protect these bearing surfaces at all positions of the slide along its working stroke. These dirt shields, which are shown in greater detail in FIGS. 4, 6 and 7 include a top shield or cover 74 which is fastened to the inner edge of the slide adjacent the top cap 66 and extends rearwardly from the pivot pin 46 to project a sufficient distance beyond the rear end of the die slide 50 that when the slide is at the forward end of its stroke, the shield will still extend over the top of the slide bearing plates. A rear shield 76 extends downwardly from the rear portion of top shield 74 rearwardly of the die slide 50 to extend across the inside of the slide bearing space when the slide is in the forward position. The rear shield 76 has a depending lip 77 along its lower edge, and this lip extends downwardly adjacent the beveled edge 69 on the inside bearing plate 68 to prevent the entry of chips into the bearing space over the top edge of the inside bearing plate 68.

On the front end of the die slide 50 a sheet metal cover 80 is secured and is formed to have a top surface of 81 extending forwardly flush with a top surface of top guard 74 and a side surface 82 extending forwardly approximately flush with the die face of the moving die 70. Cover 80 serves to shield and protect the bearing space when the die slide is in a rearward position. Another shield 83 is positioned to extend along the lower edge of the die slide 50 below the die 70 and projects downwardly adjacent the beveled edge 69 of the inner bearing plate 68. As indicated most clearly in FIG. 7, the lower edges of the side surface 82 of sheet metal cover 80, shield 83, and depending lip 77 all extend downwardly below the upper edge of the inner bearing plate 68 and positively prevent the entry of chips over the top of this bearing plate and onto the bearing surfaces for the die slide 50.

The stationary thread rolling die 90 is mounted on a suitable supporting block 91 by clamps 92 and positioned by a thrust block 93. Supporting block 91 is positioned in the die housing 55 adjacent the side wall 58 at the forward end of the housing below tie bar 61. It will therefor be seen that when the die slide 50 is in its rearmost position, the moving die 70 is behind the stationary die 90 so that when a blank is positioned between these two dies and the die slide 50 pulled forward by drive lever 40, threads will be rolled on the blank which at the end of the stroke will then be ejected out of the front end of the machine after it has been rolled along full length of stationary die 90.

The mechanism for feeding the blanks to be threaded into the space between the thread rolling dies 70 and 90 is mounted within the die housing 55 rearwardly of the stationary die supporting block 91. This blank feeding mechanism includes an injector housing 100 which has a projecting tongue 101 to make a sliding fit within a groove 102 on a guide plate 103. Guide plate 103 is fastened to the die housing 55 along the side wall 58, and serves as a guide for the injector housing 100 which is vertically adjustable by means of a screw 105 which extends vertically downward through the injector housing to bear on the bottom wall 57 of the die housing. A suitable clamp bolt indicated at 104 holds the injector housing 100 firmly in place on the guide plate 103.

The blanks to be threaded, such as bolt and screw blanks which have been formed by the heading machine 20, are fed to the thread roller along feed tracks 110 and 111 which are inclined at the same angle as the die housing 55. It is understood that the thread roller can be used apart from the heading machine and the blanks fed to the feed tracks 110 and 111 by a suitable hopper fed mechanism. Feed tracks 110 and 111 are spaced apart to receive the shank of the blank with the head resting on the upper surface of the tracks. At their lower ends, feed tracks 110 and 111 transfer the blanks to a pair of lower feed tracks 112 and 113 respectively, which are mounted on the injector housing 100. Track 112 is mounted directly on the inner side 107 of injector housing 100, while the other or outer track 113 extends downwardly toward the bottom of the die housing and is secured at its lower end on an offset step 106 on the injector housing. Both of the sets of feed tracks 110 and 111, and 112 and 113 are spaced apart a distance slightly greater than the diameter of the shanks of the blanks so that the blanks are properly held in vertical alignment in the plane of the tracks.

Since the tendency of the blanks is to hang with their shanks vertical and at an angle to the inclined feed tracks, the movement of blanks in this position down the feed tracks would tend to cause the head of one blank to ride on top of the head of the blank in front of it and thereby possibly cause the blanks to lock together and jam in the track. Accordingly, a top guide is provided over the feed tracks to prevent this cocking of the blanks and restrain them to extend substantially perpendicular to the top surface of the tracks. This top guide 114 is positioned over the upper feed tracks 110 and 111 and is spaced above the top surface of the tracks a distance slightly greater than the thickness of the blank heads to allow sufficient clearance so that the blanks will not bind against the top guide. At its lower end, top guide 114 is attached to the end of the lower top guide 115 which is fastened by screws 116 to a bracket 117 on the top surface of injector housing 100. Top guide 115 projects outwardly over the space between the lower feed tracks 112 and 113 and is vertically adjustable by means of screws 118.

At the lower end, the inside face of the outer lower feed track 113 adjacent the inner track 112 is beveled toward the die slide 50 as shown at 120. A thin, sheet metal guide plate 122 is secured on top of the lower end of injector housing 100 by screws 123 and is recessed into the upper surface of track 112 so that the upper surface of guide plate 122 is flush with the upper surface of track 112. Guide plate 122 has an angularly extending edge 124 parallel to the beveled face 120 on feed track 113, and adjacent the lower end 126 of track 113 guide plate 122 is formed with an arcuate edge 127 curving toward the die slide 50. Thus the lower feed tracks 112 and 113 together with guide plate 122 serve to conduct the blanks along a path parallel to the die space and spaced away from it only by the thickness of the outer lower feed track 113. The angular edge 124 on the guide plate 122 and the beveled face 120 on feed track 113 direct the blanks into a position adjacent the stationary die 90 so that at the transfer opening 128 between end 126 and arcuate edge 127, the lowermost blank must move through only the distance equal to the diameter of the shank to pass into the space between the thread rolling dies 70 and 90.

In order to feed the blanks from the transfer opening 128 into the die space between the thread rolling dies 70 and 90, an injector 130 is slidably journaled on the injector housing 100 for movement to and from the die space so that the injector tip 131 positively engages the side of the blank and transfers it through the opening 128 into the die space. The drive for the injector 130 is supplied by a radial disc cam 135 secured on the crankshaft 30 adjacent side wall 34 of the drive housing. A cam follower lever 137 is pivotally journaled on a pivot shaft 138 which is mounted on the drive housing 31 to extend transversely between side wall 34 and an intermediate wall 140. At its lower end lever 137 carries a cam follower roller 141 to ride along the surface of cam 135. At its upper end the cam follower lever 137 is connected by a pivot pin 143 to a transfer rod 145 which extends rearwardly and upwardly beneath the die housing 55. The end of transfer rod 145 adjacent pivot pin 143 is provided with a threaded portion 146 to receive a nut 147 which provides a support for a thrust washer 148. Washer 148 rests against one end of a compression spring 149 surrounding transfer rod 145 while the other end of spring 149 abuts against an anchor plate 151 attached to the drive housing 31. Spring 149 serves to impart a forward bias to the transfer rod 145 to pivot the cam follower lever 137 and maintain the cam follower roller 141 in engagement with the surface of cam 135.

The other end of transfer rod 145 is connected by a pivot pin 153 to the lower end of a transfer lever 154. Transfer lever 154 is pivotally journaled on a rocker shaft 155 which extends transversely to the drive housing and is secured at each end on ears 156 and 157 projecting rearwardly from the drive housing side walls 34 and 35, respectively. A block 159 is mounted on the upper end of transfer lever 154 by means of a pin 160, and the block is clamped in place by adjusting screws 161 which position the block 159 on the lever for adjustment purposes. A pivot pin 163 on the upper end of block 159 connects the block to a link 164 whose other end is connected by a pin 165 to a connecting bar 166 slidably journaled within the injector housing 100. The other end of connecting bar 166 is attached to a pivot pin 168 or one arm 171 of a bell crank 170 which is pivotally journaled on a vertical shaft 169 within the injector housing 100. The other arm 172 of bell crank 170 carries a projecting pin 174 which fits within a slot 175 on the end of injector 130 to transmit motion thereto in response to the oscillation of bell crank 170.

After the blanks have been inserted into the die space by the injector 130, it is necessary that they be advanced and positioned relative to the dies so that they will be firmly gripped between the dies as the moving die 70 starts forward on its forward or working stroke. For this purpose, a pusher 180 in the form of a flat steel plate, having a head portion 181 adapted to engage the shank of a blank injected into the die space, is mounted for reciprocating movement in between the two thread rolling dies 70 and 90. In order to support the pusher 180, a bracket 184 is bolted to the bottom wall 57 of die housing 55 and has an upstanding leg 185 extending adjacent to one side of pusher 180. A support pin 187 extends horizontally from leg 185 and has a flattened tip 186 to fit within a horizontal slot 182 on the pusher to serve as a support bearing.

The drive for the pusher 180 is supplied by a radial disc cam 190 mounted on the crankshaft 30 between the injector cam 135 and crank pin 37. A cam follower lever 192 having angularly disposed arms 193 and 196 is pivotally journaled on the pivot shaft 138 adjacent the injector cam follower lever 137. The one arm 193 extends horizontally adjacent the pusher cam 190 and carries a cam follower roller 194 to contact the periphery of the cam 190. The other arm 196 of cam follower lever 192 extends upwardly and at its upper end is connected by a pivot pin 198 to a transfer rod 200. The transfer rod 200 extends through an opening in a spring anchor bracket 202 bolted to the top wall 52 of drive housing 31. A compression spring 203 is mounted on transfer rod 200 outwardly of the bracket 202 and abuts at one end on the bracket and at the other end against a thrust washer 206 supported by a nut 205 mounted on the threaded portion 204 at the other end of the transfer rod. The end of transfer rod 200 opposite the cam follower lever arm 196 is connected by a pivot pin 208 to a transfer lever 210 pivotally journaled on rocker shaft 155 adjacent the injector transfer lever 154. A block 212 is mounted on the upper end of transfer lever 210 by a pin 213 and positioned relative to the transfer lever by a pair of adjusting screws 214. At its upper end block 212 is connected by a pin 216 to the end of pusher 180 opposite the head portion 181.

As previously stated, a top guide is provided over the inclined feed tracks to prevent the tipping of the blanks as they progress downward along the tracks, and to maintain the alignment of blanks when they are being fed into the die space, an additional top guide is provided to cover the lower end of the feed tracks below the lower top guide 115. A bracket 220 is mounted on the top of injector housing 100 adjacent the guide plate 122 and extends outwardly away from the feed tracks. At its outer end bracket 220 is provided with a pair of upstanding ears 221 which support pivot pin 222. The top guide 225 is generally T-shaped having a shank 224 which is journaled at its outer end on pivot pin 222, with a transverse bar portion or guide 226 extending over the lower portions of the lower feed tracks 112 and 113. A pivot pin 228 projects outwardly from the outer side of transverse bar portion 226 to mount a release foot 230 whose lower surface 231 projects over the die space in front of transfer opening 128. A housing 223 is also formed on transverse bar portion 226 to contain a spring loaded plunger 235 which serves to bias release foot 230 downwardly toward the top of the blanks being fed into the die space. A projecting ear 236 on the upper side of release foot 230 carries an adjusting screw 237 which contacts the upper side of transverse bar portion 226 and limits the downward position of the release foot. The spacing of the transverse bar portion 226 above the feed tracks is determined by a support screw 239 which is threadedly engaged in shank 224 to rest on the top surface of bracket 220. The top guide 225 can be raised out of the way by pivoting it upwardly about the pivot pin 222, and the top guide is normally held in the downward position with screw 237 in contact with bracket 220 by means of an adjustable clamp 240.

Since in the illustrated embodiment, the drive of the thread roller is interconnected with heading machine 20, the thread roller is driven so that the crankshaft 30 makes one revolution and the die slide 50 one complete stroke each time the heading machine finishes a completed blank. The formed blanks are ejected from the heading machine 20 onto the upper feed tracks 110 and 111, and because of the inclination of these tracks the blanks, indicated at 250 as being of the hex-headed cap screw variety, slide down these tracks onto the lower feed tracks 112 and 113. After several cycles of the heading machine, a plurality of blanks are positioned within the feed tracks, and these blanks align themselves upwardly from the lower end of feed tracks with their heads in abutting contact to form a stack from which the lowermost blank is fed into the die space by the action of injector 130. Because the top guides 114 and 115 are spaced away from the top surface of the feed tracks a distance only slightly greater than the thickness of the blank heads, the shanks of the blanks will extend substantially perpendicular to the feed tracks instead of hanging vertical. After the blanks pass from beneath the lower top guide 115, this orientation is maintained by the transverse bar 226 of top guide 225. As the blanks are pushed into the die space by injector 130, their heads pass under the spring loaded release foot 230 which presses the blanks downward to insure that the blank heads are firmly in contact with the top surfaces of the dies 70 and 90.

The motions of the injector 130 and pusher 180 are controlled by the cams 135 and 190 on the crankshaft 30, with the high point on each of these cams serving to retract the injector and pusher which are biased in the forward direction by the compression springs 149 and 203, respectively. Thus for each rotation of the crankshaft 30, the injector and pusher are moved through one stroke in timed relationship with the stroke of the die slide 50.

The operation of the injector 130 and pusher 180 in feeding the blanks into the die space between the thread rolling dies will be seen more clearly in conjunction with FIGS. 12, 13 and 14. FIG. 12 shows the relative position of the various parts of the blank feeding mechanism as the die slide 50 has partially completed its forward stroke. The injector 130 is in the retracted position, while the pusher 180 is at the forward end of its stroke having pushed a blank 251 into the die space where it is gripped between moving die 70 and stationary die 90. Since the pusher 180 has reached the end of its stroke, further movement of the moving die 70 will carry the blank 251 away from the pusher and eject the blank as a finished bolt at the end of the forward stroke. The subsequent blank 252, which is to be fed into the die space on the next stroke, is resting on top of the guide plate 122 and lower track 113 with the side of its shank in contact with the tapered or recessed portion 179 on the edge of pusher 180. By providing the tapered or recessed portion 179 on the pusher, the blank 252 is able to project farther through transfer opening 128 into the die space to decrease the distance through which blank 252 must be moved by the injector 130. It will be understood that blank 252 is maintained in this position by the force of gravity and the weight of the other blanks indicated at 253 and 254 above it in the feed tracks.

The pusher 180 normally remains in the forward position of FIG. 12 until the die slide 50 has substantially completed its return stroke, after which a high point 191 on cam 190 quickly retracts pusher 180 as the die slide 50 completes its rearward stroke. As indicated in FIG. 13, as the pusher 180 is retracted, injector cam 135 has a low point 136 which allows compression spring 149 through the intermediate linkage to force the injector 130 forward so that its tip 131 engages bolt blank 253 and pushes it into the die space in front of pusher 180. The subsequent blank 254 remains stationary since the injector tip 131 blocks off the feed tracks as it moves forward into transfer opening 128, so that blank 254 cannot move downwardly until the injector has been retracted. To provide sufficient time for the injector 130 to complete its forward stroke and shift the blank 253 into the die space, the pusher 180 dwells for a short portion of the cycle in the retracted position as shown in FIG. 13, and before the injector 130 starts to retract under the action of a rise on cam 135, pusher 180 starts forward to position blank 253 between the dies as shown in FIG. 14. After the pusher 180 has moved forward to a point where it blocks off transfer opening 128, the injector 130 is retracted, and the subsequent blank 254 moves downward into the transfer opening 128 in contact with the recessed portion 179 on the pusher. As illustrated in FIGURE 2 the low point 136 extends along the periphery of the cam 135 for a distance substantially less than one half the length the periphery thereof so the ejector remains forward only a short time during the cycle of the machine and it is retracted during the majority of the machine cycle to allow the blank to be carried by gravity down into the position of FIGURE 12 even though the machine is operating at a high cyclic rate. The die slide 50 then completes its reversal at the end of its rearward stroke and starts its forward movement and the moving die 70 and pusher 180 move forward and transfer blank 253 into the position of blank 251 shown in FIG. 12.

Because connecting rod 38 is relatively short compared to the throw of crank pin 37, and because the crank pin 37 passes through bottom dead center, as shown in FIG. 2, when the die slide 50 is in the rearward position, very little motion is imparted to the die slide over the portion of the revolution of crankshaft 30 during which the injector and pusher are operated to feed a blank into the die space. This motion produces in effect a slight dwell for the moving die 70 because of the relatively slow reversal of the die slide. Since a limiting factor in the speed of operation of injector 130 and pusher 180 is the inertia of these parts and of the blank, the provision of an effective dwell at the rearward reversal of the die slide allows a greater portion of the cycle to be available for the operation of the blank feeding mechanism. Hence the thread roller can operate at a higher cyclic speed while retaining the same length of time for operation of the blank feeding mechanism than would be possible if this dwell were not present.

Since the feed tracks are arranged so that they are spaced away from the die space only by the thickness of the outer feed tracks 111 and 113, the blanks pass along a straight path down to the arcuate edge 127 on guide plate 122. Since the lowermost blank is retained within the feed tracks by the pusher 180 when the latter is at the forward portion of its stroke, the blank moves through a distance no greater than the diameter of its shank as it is transferred into the die space by the injector 130. By holding the distance through which the blanks must move during feeding to this minimum, the blanks will remain under control at all times, since the speeds of the blank and the blank feeding mechanism is also held to a minimum.

It will be understood that at the forward end of the stroke of die slide 50, the threads have been rolled on each blank and the latter is ejected from between the dies. As shown in FIG. 1, the lower end of the die housing 55 below the tie bar 61 is enclosed by a sheet metal cover 257 which provides additional protection to prevent the entry of dirt and chips into the die space, and also serves as a receptacle to receive the finished bolts ejected from the dies. Cover 257 is closed at its lower end by a door 258 which may be opened from time to time to remove the finished bolts.

Although the preferred embodiment of the invention has been shown and described in considerable detail, it will be appreciated by those skilled in the art that various modifications and rearrangements may be made therein without departing from the scope of the invention as defined in the following claims.

What is claimed is:

1. A thread roller comprising a frame, a fixed die on said frame, a reciprocating die slidably journaled on said frame for movement between a forward and a rearward position, said dies defining a die space therebetween, a pair of feed tracks extending to an opening adjacent said die space, a pusher reciprocable on said frame from a forward position in which it starts blanks between said dies simultaneously blocking said opening and a rearward position clear of said opening, an injector reciprocable on said frame to a forward position in which it moves a single blank through said opening into said die space simultaneously blocking said tracks and a rearward position clear of said tracks, a drive shaft, first drive means connected to reciprocate said reciprocating die through a predetermined cycle in response to movement of said drive shaft, second drive means connected to reciprocate said pusher in response to movement of said drive shaft, and third drive means connected to reciprocate said injector in response to movement of said drive shaft, said drive means operating to produce the sequential steps of moving said pusher to its rearward position clear of said opening as said reciprocating die approaches its rearward position, moving said injector forward while said pusher is in its rearward position, moving said pusher forward when said injector is forward and said reciprocating die reaches its rearward position and maintaining said pusher forward until said reciprocating die again approaches its rearward position, and thereafter moving said injector to its rearward position and said reciprocating die toward its forward position, said injector remaining in its rearward position so that said blanks are movable along said tracks under the influence of gravity into position against said pusher for a minimum period of time which is substantially more than one half of the time of said cycle.

2. A thread roller comprising a frame, a fixed die on said frame, a reciprocating die slidably journaled on said frame for reciprocating through a predetermined cycle, said dies defining a die space therebetween, pusher means including a slidable pusher adapted to advance blanks within said die space, and means to feed blanks into said die space comprising a pair of inclined feed tracks along which blanks move under the influence of gravity extending to a position adjacent said pusher and defining an opening adjacent said die space, said pusher being operable to close off said opneing when said reciprocating die is spaced from adjacent the rearward end of its stroke, said pusher retracting to uncover said opening only when said reciprocating die is adjacent the rearward end of a stroke, an injector means operable to transfer a blank from said feed track through said opening into said die space, and power means connected to drive said reciprocating die, pusher and injector means operating to retract said injector means clear of said feed tracks during a minimum period of time which is substantially more than one half of the time of one cycle of said reciprocating die.

3. A thread roller comprising a frame, a fixed die on said frame, a reciprocating die slidably journaled on said frame for reciprocation through a predetermined cycle, said dies defining a die space therebetween, pusher means including a slidable pusher adapted to advance blanks within said die space, and means to feed blanks into said die space comprising a pair of inclined feed tracks along which blanks move under the influence of gravity extending to a position adjacent said pusher and defining an opening adjacent said die space, said pusher being operable to close off said opening and prevent movement of blanks along said feed tracks at all times during the cycle when said reciprocating die is spaced from adjacent the rearward end of its stroke, said pusher retracting to uncover said opening only when said reciprocating die is adjacent the rearward end of its stroke, and injector means operable to transfer a blank from said feed tracks through said opening into said die space when said pusher is retracted, said injector means being positioned clear of said feed tracks for substantially more than one half of the time of one cycle of said reciprocating die to allow blanks to move along said tracks into engagement with said pusher adjacent at said opening during a period substantially more than one half of the time of one cycle of said reciprocating die.

4. A thread roller comprising a frame, a fixed die on said frame, a reciprocating die slidably journaled on said frame for movement between forward and retracted positions along an inclined plane, means to drive said reciprocating die including a crankshaft journaled in said frame below said dies, means to rotate said crankshaft, a crank on said crankshaft, a drive lever pivotally journaled on said frame below said dies, said drive lever having one arm connected to said reciprocating die at the lower end thereof, said drive lever having another arm extending adjacent said crank, a connecting rod connecting said other arm to said crank, said drive means providing a slow reversal of said reciprocating die at the retracted position and a faster reversal of said die at the forward position.

5. A thread roller comprising a frame, a fixed die on said frame, a reciprocating die slidably journaled on said frame for movement between forward and retracted positions along an inclined plane, said dies defining a die space therebetween, drive means for said reciprocating die including a crankshaft journaled on said frame below said dies, a drive lever pivotally mounted on said frame below said dies, said drive lever having one arm connected to said reciprocating die at the lower end thereof, a crank on said crankshaft, said drive lever having another arm extending adjacent said crank, a connecting rod connecting said crank to said other arm, said drive means providing a slow reversal of said reciprocating die in the rearward position and a faster reversal in the forward position, a slidable pusher adapted to advance blanks within said die space, and means to feed blanks into said die space comprising a pair of feed tracks extending adjacent one end of said die space, said feed tracks being spaced away from said die space and parallel thereto, said feed tracks defining an opening adjacent said die space, said pusher being operable to close off said opening when said reciprocating die is on the forward portion of its stroke, said pusher retracting to uncover said opening when said reciprocating die is adjacent the retracted position, and injector means operable to transfer a blank from said feed tracks through said opening into said die space when said pusher is retracted.

References Cited in the file of this patent

UNITED STATES PATENTS

| | | |
|---|---|---|
| 1,696,225 | Blood | Dec. 25, 1928 |
| 1,798,920 | Wilcox | Mar. 31, 1931 |
| 2,464,883 | Neumann | Mar. 22, 1949 |
| 2,859,647 | Nielsen | Nov. 11, 1958 |

FOREIGN PATENTS

| | | |
|---|---|---|
| 717,360 | Great Britain | Oct. 27, 1954 |